US012799813B2

(12) United States Patent
Holt et al.

(10) Patent No.: US 12,799,813 B2
(45) Date of Patent: Nov. 17, 2026

(54) BRAKE ASSEMBLY WITH AN OVER RUNNING GEAR FOR AN ARCHITECTURAL STRUCTURE COVERING

(71) Applicant: HUNTER DOUGLAS INC., New York, NY (US)

(72) Inventors: Ronald Holt, Westminster, CO (US); Sam Nesmith, Broomfield, CO (US)

(73) Assignee: Hunter Douglas Inc., New York, NY (US)

( * ) Notice: Subject to any disclaimer, the term of this patent is extended or adjusted under 35 U.S.C. 154(b) by 59 days.

(21) Appl. No.: 19/107,340

(22) PCT Filed: Aug. 16, 2023

(86) PCT No.: PCT/US2023/030315
§ 371 (c)(1),
(2) Date: Feb. 27, 2025

(87) PCT Pub. No.: WO2024/049639
PCT Pub. Date: Mar. 7, 2024

(65) Prior Publication Data
US 2026/0055659 A1 Feb. 26, 2026

Related U.S. Application Data

(60) Provisional application No. 63/403,523, filed on Sep. 2, 2022.

(51) Int. Cl.
*E06B 9/322* (2006.01)
*E06B 9/262* (2006.01)
(Continued)

(52) U.S. Cl.
CPC .............. *E06B 9/322* (2013.01); *E06B 9/262* (2013.01); *E06B 9/80* (2013.01); *E06B 9/90* (2013.01); *E06B 2009/905* (2013.01)

(58) Field of Classification Search
CPC ..... E06B 9/88; E06B 9/80; E06B 9/60; E06B 9/262; E06B 9/322; E06B 9/78; E06B 9/42; E06B 2009/905; E06B 2009/807
See application file for complete search history.

(56) References Cited

U.S. PATENT DOCUMENTS 6,536,503 B1 * 3/2003 Anderson ............... E06B 9/322 242/375.3
8,342,309 B2 * 1/2013 Takagi .................... E06B 9/322 192/223.4
(Continued)

FOREIGN PATENT DOCUMENTS

| | | | |
|---|---|---|---|
| DE | 102004035117 | A1 | 2/2006 |
| EP | 3461987 | A2 | 4/2019 |
| WO | 2022115233 | A1 | 6/2022 |

OTHER PUBLICATIONS

International Search Report and Written Opinion for International Application No. PCT/US2023/030315, filing date Aug. 16, 2023, 14 pages.

*Primary Examiner* — Justin B Rephann
(74) *Attorney, Agent, or Firm* — Dority & Manning, P.A.

(57) ABSTRACT

A brake assembly for use in an architectural-structure covering. The architectural-structure covering includes a rotatable member and a covering movable between a retracted position and an extended position. The brake assembly is operatively coupled to the rotatable member. The brake assembly is arranged and configured to permit rotation of the rotatable member in a first direction and to inhibit rotation of the rotatable member in a second or opposite direction to maintain a desired position of the covering. For example, the brake assembly is arranged and configured to prevent, or at least inhibit, unwanted extension of the covering due to the force of gravity. In some embodiments, the brake assembly includes a hub, a wrap spring, a drum, a one-way gear (e.g.,
(Continued)

a running gear such as, for example, a pinion or spur gear), and a housing.

20 Claims, 10 Drawing Sheets

(51) Int. Cl.
*E06B 9/80* (2006.01)
*E06B 9/90* (2006.01)

(56) References Cited

U.S. PATENT DOCUMENTS

| | | | | |
|---|---|---|---|---|
| 8,752,607 | B2 * | 6/2014 | Anderson | E06B 9/322 160/171 |
| 9,593,530 | B1 * | 3/2017 | Anthony | E06B 9/80 |
| 9,650,829 | B2 * | 5/2017 | Anderson | E06B 9/322 |
| 9,765,565 | B2 | 9/2017 | Morris | |
| 10,829,990 | B2 * | 11/2020 | Anderson | E06B 9/262 |
| 10,890,028 | B2 * | 1/2021 | Anthony | E06B 9/44 |
| 11,111,721 | B2 * | 9/2021 | Anderson | E06B 9/262 |
| 2004/0163774 | A1 * | 8/2004 | Nien | E06B 9/307 160/168.1 P |
| 2008/0099281 | A1 * | 5/2008 | Anderson | E06B 9/322 185/37 |
| 2010/0037717 | A1 * | 2/2010 | Takagi | E06B 9/322 74/63 |
| 2012/0267060 | A1 * | 10/2012 | Anderson | E06B 9/262 160/307 |
| 2015/0364969 | A1 * | 12/2015 | Brondex | E06B 9/90 160/310 |
| 2017/0051559 | A1 * | 2/2017 | Anthony | E06B 9/80 |
| 2017/0218697 | A1 * | 8/2017 | Chen | F16H 19/06 |
| 2018/0320438 | A1 * | 11/2018 | Anderson | E06B 9/262 |
| 2019/0085632 | A1 | 3/2019 | Smith | |
| 2019/0343318 | A1 * | 11/2019 | Cheng | E06B 9/78 |
| 2020/0332596 | A1 * | 10/2020 | Sonzini | E06B 9/90 |
| 2021/0310305 | A1 * | 10/2021 | Heredia | E06B 9/90 |
| 2021/0363817 | A1 * | 11/2021 | Anderson | E06B 9/262 |

* cited by examiner

BRAKE ASSEMBLY WITH AN OVER RUNNING GEAR FOR AN ARCHITECTURAL STRUCTURE COVERING

CROSS-REFERENCE TO RELATED APPLICATIONS

This application is a National Phase filing of International Application No. PCT/US2023/030315, filed Aug. 16, 2023, which application is a non-provisional of, and claims the benefit of the filing date of, U.S. provisional patent application No. 63/403,523, filed Sep. 2, 2022, entitled “Brake Assembly with an Over Running Gear for an Architectural Structure Covering,” the entirety of each application is incorporated by reference herein.

FIELD OF THE DISCLOSURE

The present disclosure relates generally to the field of architectural-structure coverings, and more particularly to a brake assembly incorporating a gear or an over running clutch (terms used interchangeably herein) for use in an architectural-structure covering.

BACKGROUND

Architectural-structure coverings may selectively cover an architectural structure such as, for example, a window, a doorway, a skylight, a hallway, an archway, or a portion of a wall (collectively an architectural structure without the intent to limit). Architectural-structure coverings may include a covering that can be extendable and retractable, for example, vertically extendable or retractable (e.g., able to be lowered or raised, respectively, in a vertical direction) relative to a horizontally-oriented headrail between an extended position and a retracted position for obscuring and exposing the underlying architectural structure.

To move the covering between the extended and retracted positions, some architectural-structure coverings include a rotatable member (e.g., a rod, a shaft, a roller, etc.). In use, rotation of the rotatable member in a first direction may retract the covering while rotation of the rotatable member in a second or opposite direction may extend the covering. In the retracted position, the covering of the architectural-structure covering may be gathered or stacked adjacent to, or wrapped around, the rotatable member. For example, some retractable coverings are raised or lowered as lift cords are wrapped about or unwrapped from the rotatable member. The architectural-structure covering may include lift cords which are coupled to the covering and the rotatable member. In use, rotation of the rotatable member in the first direction causes the lift cords to wrap about the rotatable member causing the covering to retract adjacent to the rotatable member while rotation in the second or opposite direction causes the lift cords to unwrap from the rotatable member causing the covering to extend or move in an extended configuration. Alternatively, in various embodiments, the covering may be wrapped around the rotatable member in the retracted position. For example, some retractable coverings include a flexible covering suspended from the rotatable member. The covering can either be wrapped about the rotatable member to retract the covering or unwrapped from the rotatable member to extend the covering. Regardless of the form of the retractable covering, rotation of the rotatable member generally causes movement of the covering of the architectural-structure covering.

To actuate movement of the rotatable member, and thus the covering of the architectural-structure covering, the architecture-structure covering may include a weighted bottom rail. In use, the covering may be extended or retracted by a human operator grasping and moving the bottom rail (e.g., the human operator may pull down on the bottom rail to extend the covering or lift up on the bottom rail to retract the covering). Alternatively, the architectural-structure covering may include an operating element, for example, a cord, a chain, a tilt wand, or the like. In use, a human operator manipulates the operating element to move the covering between the extended and retracted positions. Alternatively, and/or in addition, the operating element may be in the form of a motorized system arranged and configured to rotate the rotatable member, and hence extend or retract the covering.

In addition, and/or alternatively, the architectural-structure covering may include one or more spring-assisted lift assemblies arranged and configured to assist with retracting the covering.

In various embodiments, the architectural-structure covering may also include a brake assembly arranged and configured to maintain a position of the covering. For example, during extension or retraction of the covering, upon reaching a desired position, the brake assembly may be utilized to maintain the covering in the desired position (e.g., to prevent further extension of the covering via gravity and/or unintentional retraction of the covering via, for example, the spring-assisted lift assembly).

One problem associated with conventional brake assemblies is that some brake assemblies introduce excess drag into the system that needs to be overcome. That is, during retraction of the covering, conventional brake assemblies introduce drag that needs to be overcome in order to raise or retract the covering. In certain instances, this drag was found to be approximately 0.1 pounds per weight of covering. Thus arranged, conventional brake assemblies were rendered unusable with smaller coverings.

In additional, conventional brake assemblies have a slight lag before engagement. As a result, during use, when the covering is moved to its desired position and released, the covering may initially drop under the force of gravity before the brake assembly takes hold, which results in displeasing aesthetics and complaints. For example, conventional brake assemblies have been found to allow the covering to drop by approximately three-eighths inch to one-half inch.

Thus, it would be beneficial to provide a brake assembly that eliminates, or at least greatly minimizes drag, so that the brake assembly could be used in a wider variety of architectural-structure coverings. In addition, it would be beneficial to provide a brake assembly that eliminates, or at least minimizes, unwanted downward extension of the covering due to the force of gravity.

It is with respect to these and other considerations that the present improvements may be useful.

SUMMARY

This Summary is provided to introduce a selection of features in a simplified form that are further described below in the Detailed Description. This Summary is not intended to identify key features or essential features of the claimed subject matter, nor is it intended as an aid in determining the scope of the claimed subject matter.

Disclosed herein is a brake assembly arranged and configured to be used in an architectural-structure covering. The architectural-structure covering includes a rotatable member and a covering movable between a retracted position and an extended position. The brake assembly is arranged and configured to couple to the rotatable member and to permit rotation of the rotatable member in a first direction and to inhibit rotation of the rotatable member in a second or opposite direction relative to the first direction to maintain a desired position of the covering. In some embodiments, the brake assembly includes a housing, a hub, a drum including a gear, a wrap spring, and a gear such as, for example, a running gear, a one-way gear, etc. The hub is arranged and configured to be non-rotatably coupled to the rotatable member so that the rotatable member and the hub rotate in unison. The wrap spring is configured to operatively couple the hub and the drum. The one-way gear is operatively associated with the gear of the drum. In the first direction, the one-way gear is in a disengaged state relative to the housing. In the opposite direction, the one-way gear is in an engaged state relative to the housing. Rotation in the first direction causes the hub to rotate the wrap spring, which rotates the drum and the one-way gear so that the hub, the wrap spring, the drum, and the one-way gear rotate in unison. Rotation in the second or opposite direction causes the hub to rotate the wrap spring, with the one-way gear engaged to the housing, the drum can slip relative to the wrap spring so that rotation of the hub is no longer transferred to the drum.

In some embodiments, the wrap spring includes an inwardly projecting tine arranged and configured to be received within an opening formed in the hub.

In some embodiments, rotation in the first direction causes the wrap spring to expand thereby increasing frictional forces between the wrap spring and the drum (e.g., locking the wrap spring to the drum). Rotation in the second or opposite direction causes the wrap spring to constrict thereby decreasing the frictional forces with the drum.

In some embodiments, the hub includes a larger diameter first segment and a smaller diameter second segment, and the wrap spring is arranged and configured to be positioned about the larger diameter first segment of the hub.

In some embodiments, the smaller diameter second segment is arranged and configured to extend through the drum and into engagement with the housing to hold the brake assembly together.

In some embodiments, the drum includes a receptacle extending from a first end thereof, the receptacle arranged and configured to receive the larger diameter first segment of the hub and the wrap spring wound thereabout.

In some embodiments, the wrap spring is arranged and configured to operatively contact an inner surface of the receptacle of the drum to transfer rotation between the hub and the drum in the first direction, and is arranged and configured to slip with respect to the inner surface of the receptacle of the drum thereby preventing transfer of rotation between the hub and the drum in the second or opposite direction.

In some embodiments, the gear of the drum is a pinion gear formed at a second end thereof, the pinion gear arranged and configured to interact with the one-way gear.

In some embodiments, the housing includes a receptacle formed therein, the receptacle arranged and configured to receive the one-way gear, the housing further including a projection extending into the receptacle.

In some embodiments, the receptacle is arranged and configured to receive the one-way gear in a free-floating manner. That is, the one-way gear is arranged and configured to reside within the receptacle such that the one-way gear can move into and out of engagement with the projection.

In some embodiments, the projection extends into the receptacle along a bottom surface thereof so that the one-way gear moves into engagement with the projection via gravity.

In some embodiments, rotation of the drum in the first direction maintains the one-way gear in the disengaged state.

In some embodiments, the receptable is sized and configured so that the one-way gear resides within the receptacle such that the one-way gear can move into and out of engagement with the projection.

In some embodiments, with the one-way gear in the disengaged state, the one-way gear does not interact with the projection of the housing, and with the one-way gear in the engaged state, the one-way gear interacts with the projection to secure the one-way gear and the drum to the housing.

In some embodiments, in the disengaged position, the hub, the wrap spring, and the drum all rotate in unison.

Figure 1:
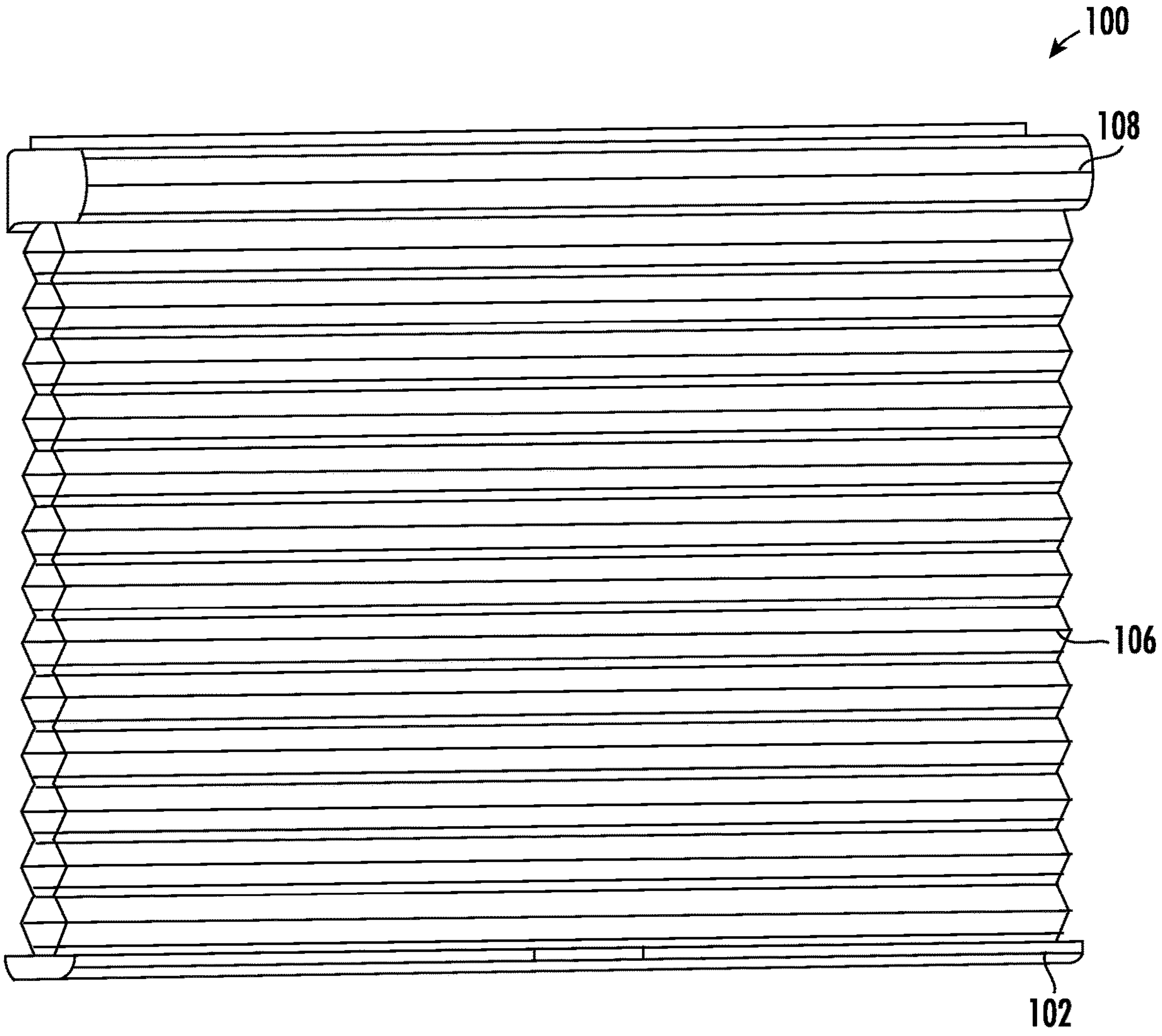
FIG. 1 is front, perspective view illustrating an example embodiment of an architectural-structure covering in accordance with one or more features of the present disclosure.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

Embodiments of a brake assembly in accordance with the present disclosure will now be described more fully hereinafter with reference to the accompanying drawings, in which preferred embodiments of the present disclosure are presented. In some embodiments, the brake assembly may include a spring such as, for example, a wrap spring, and a running or one-way gear (e.g., terms used interchangeably herein without the intent to limit or distinguish). The brake assembly of the present disclosure may, however, be embodied in many different forms and should not be construed as being limited to the embodiments set forth herein. Rather, these embodiments are provided so that this disclosure will convey certain example features of the brake assembly to those skilled in the art.

As will be described in greater detail below, the brake assembly of the present disclosure may be used in connection with any architectural-structure covering. In use, the brake assembly couples to a rotatable member of the architectural-structure covering. For example, in use, the brake assembly may include a hub arranged and configured to couple to, receive, etc. the rotatable member, which may be in the form of, for example, a shaft, a V-shaft, etc., which is operatively associated with, for example, lifts cords of the architectural-structure covering. In use, rotation of the rotatable member winds or unwinds the lift cords about the rotatable member (e.g., winds or unwinds the lift cords about spools associated with the rotatable member), which extends or retracts the covering. In use, the brake assembly couples or engages (used interchangeably herein without the intent to limit) the rotatable member to inhibit movement of the rotatable member in one direction and thus maintains a desired position of the covering (e.g., the position of the covering in a partially extended position is maintained by the brake assembly against the force of gravity) until a sufficient force is applied to the rotatable member to overcome the force provided by the brake assembly such as, for example, when the human operator desires to extend or retract the covering by pulling down on or lifting up on the bottom rail of the architectural-structure covering.

As will be described in greater detail below, in some embodiments, the brake assembly is arranged and configured to prevent, or at least inhibit, unwanted extension of the covering due to the force of gravity. As such, the brake assembly is arranged and configured to maintain the desired positioning of the covering against the force of gravity. However, while the present disclosure will be described and illustrated as preventing, or at least inhibiting, unwanted extension of the covering, the brake assembly could also be reversed and used to prevent, or at least inhibit, unwanted retraction of the covering caused by, for example, a spring-assisted lift assembly positioned in the headrail of the architectural-structure covering. Moreover, multiple brake assemblies may be used in a single architectural-structure covering to prevent, or at least inhibit, unwanted extension and retraction of the covering.

In some embodiments, the brake assembly is arranged and configured so that when the rotatable member is rotated in a first direction, the brake assembly is in a first or disengaged state or configuration so that rotation of the rotatable member is permitted and thus the covering may be moved (e.g., retracted). However, when the rotatable member is rotated in a second or opposite direction, the brake assembly is in a second or engaged state or configuration so that rotation of the rotatable member is inhibited. In the second or engaged state or configuration, the force applied by the brake assembly can be overcome by a sufficient force such as, for example, when the human operator pulls down on the bottom rail to lower or extend the covering. As such, in use, the brake assembly has little to no influence during movement of the covering when the rotatable member is being rotated in the first direction such as, for example, when the covering is being retracted. However, in the second or engaged state or configuration, the brake assembly inhibits rotation of the rotatable member. In the second or engaged state or configuration, the force applied by the brake assembly can be overcome however by the force of the human operator pulling down on the bottom rail of the covering. Once the desired position of the covering has been achieved and the force applied by the human operator has been removed, additional or further rotation of the rotatable member via, for example, the force of gravity, is prevented by the brake assembly and thus further rotation of the rotatable member and hence the covering is prevented, or at least inhibited, thereby maintaining the position of the covering. As such, the brake assembly inhibits further extension of the covering caused by, for example, the force of gravity, however this force can be overcome by a sufficient force provided by, for example, a human operator pulling down, or lifting up, on the bottom rail of the covering.

Figure 2:
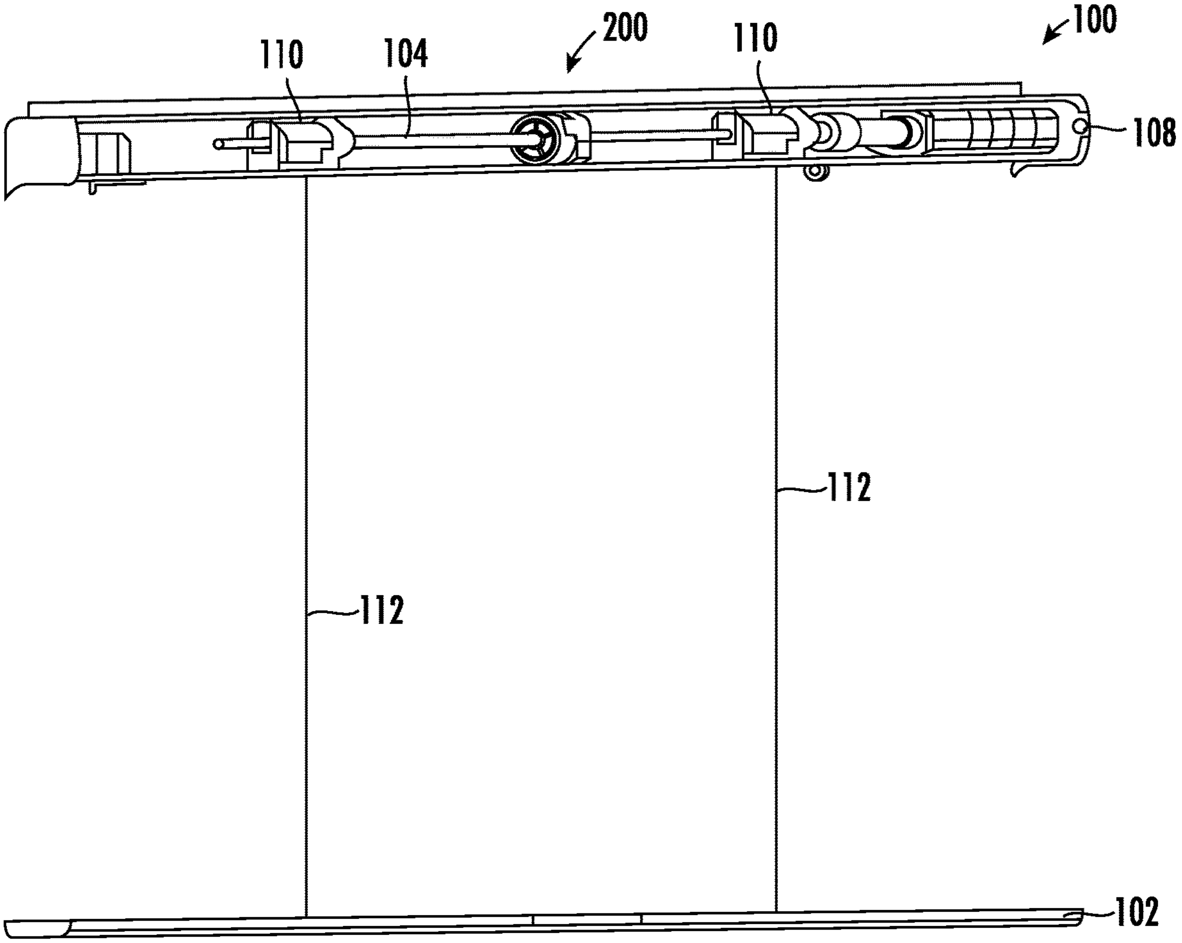
FIG. 2 is an alternate perspective view of the architectural-structure covering shown in FIG. 1, FIG. 2 illustrated with portions of the headrail and the covering removed.

Referring to FIGS. 1 and 2, in some embodiments, an architecture-structure covering 100 may include a rotatable member 104. As illustrated, the rotatable member 104 may be in the form of a rod or a shaft. Alternatively, the rotatable member 104 may be a roller tube. As previously mentioned, in use, rotation of the rotatable member 104 in one direction (e.g., a first direction) may retract the covering 106 while rotation of the rotatable member 104 in a second or opposite direction may extend or deploy the covering 106. For example, the rotatable member 104 may be coupled to lift spools 110, which are operatively associated with lift cords 112. In use, the lift cords 112 may be coupled to the covering 106 so that rotation of the rotatable member 104 in one direction (e.g., a first direction) causes the lift cords 112 to wind, wrap, etc. about the lift spools 110 causing the covering 106 to retract (e.g., stack adjacent to the headrail 108), while rotation in a second or opposite direction causes the lift cords 112 to unwind, unwrap, etc. from the lift spools 110 causing the covering 106 to extend.

In some embodiments, as illustrated, the architectural-structure covering 100 may include a brake assembly 200 in accordance with one or more features of the present disclosure. In use, the brake assembly 200 may be positioned within the headrail 108 of the architectural-structure covering 100 and may be coupled to the rotatable member 104 of the architectural-structure covering 100. During use, the brake assembly 200 is arranged and configured to enable and/or prevent, or at least inhibit, movement (e.g., rotation) of the rotatable member 104, and thus movement of the covering 106. In some embodiments, in use, the brake assembly 200 is arranged and configured to transition between a first or disengaged state or configuration and a second or engaged state or configuration. In the first or disengaged state or configuration, the brake assembly 200 allows rotation of the rotatable member 104 so that the covering 106 can move (e.g., retract) as desired. In the second or engaged state or configuration, the brake assembly 200 inhibits rotation of the rotatable member 104 to prevent, or at least inhibit, unwanted or undesired movement (e.g., extension) of the covering 106 (e.g., in the second or engaged state or configuration, the brake assembly 200 inhibits unwanted rotation of the rotatable member 104 to inhibit unintended extension of the covering 106 due to the influence of gravity or the unintended retraction of the covering 106 due to the influence of, for example, a spring-assisted lift assembly). However, in the second or engaged state or configuration, the force applied by the brake assembly 200 can be overcome by a sufficient force provided by, for example, a human operator pulling down, or lifting up, on the bottom rail 102 of the covering 106.

Figure 3:
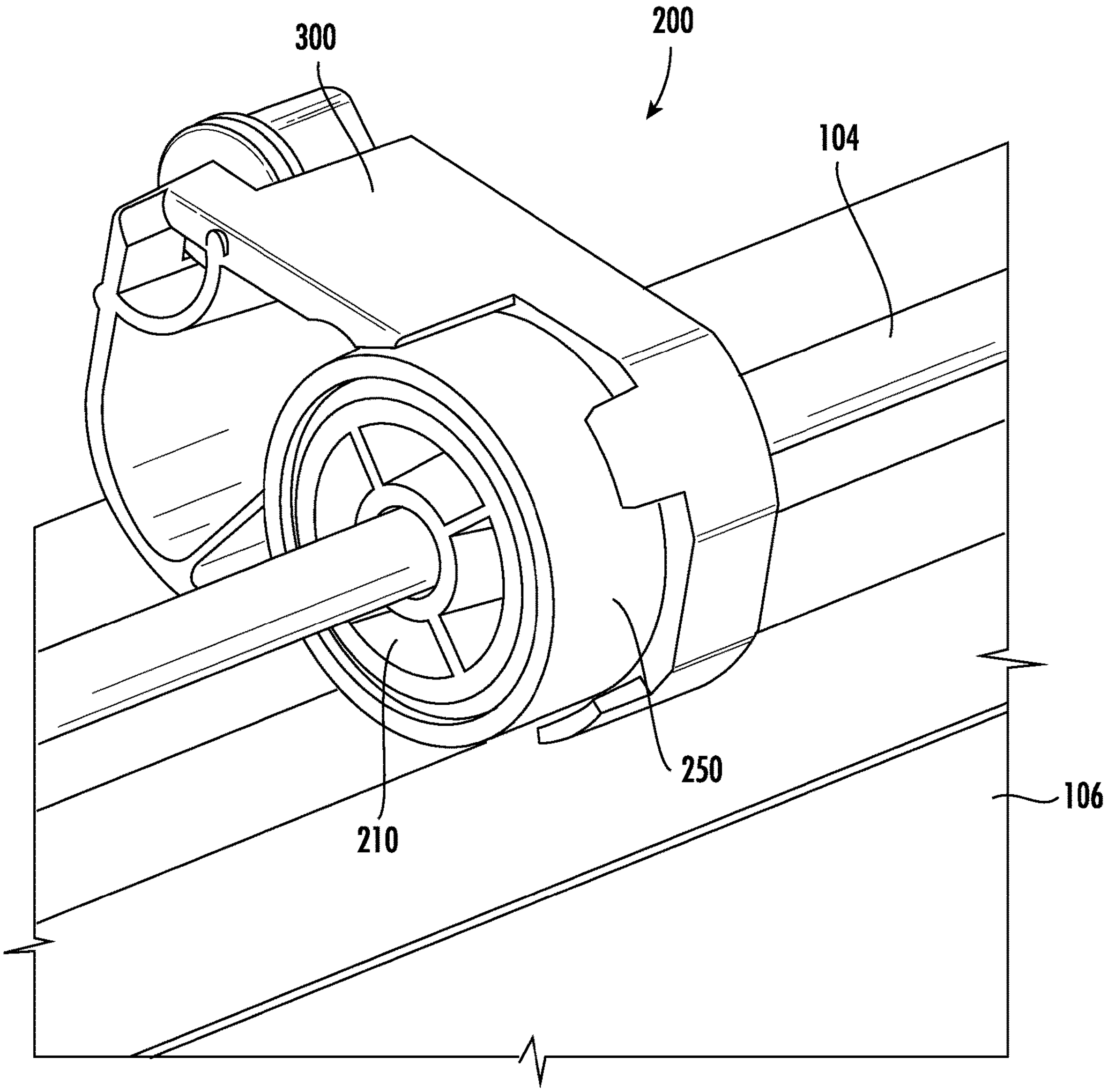
FIG. 3 is a detailed, perspective view illustrating an example embodiment of a brake assembly in accordance with one or more features of the present disclosure.
Figure 4A:
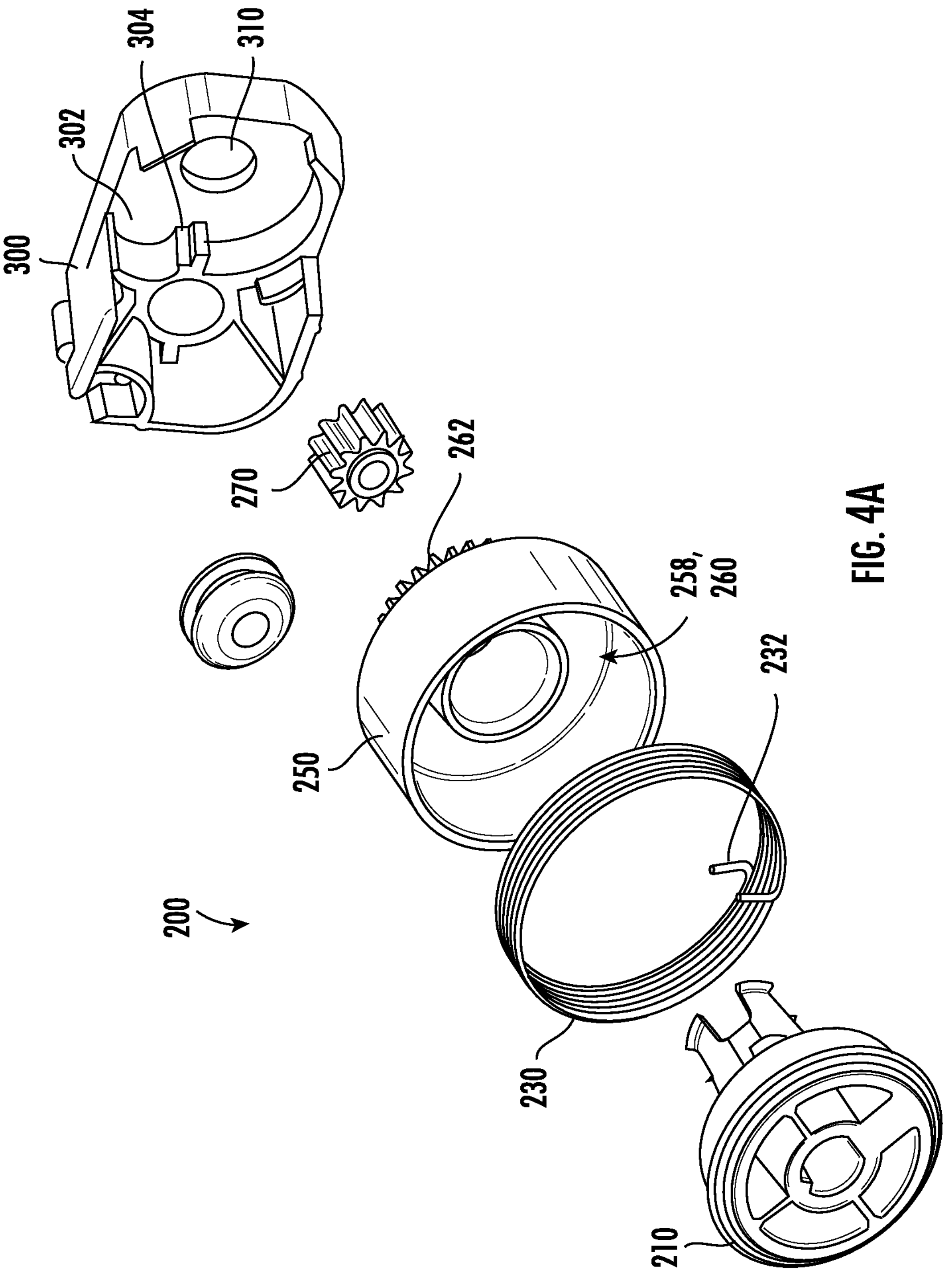
FIG. 4A is an exploded, perspective view illustrating the brake assembly shown in FIG. 3.
Figure 4B:
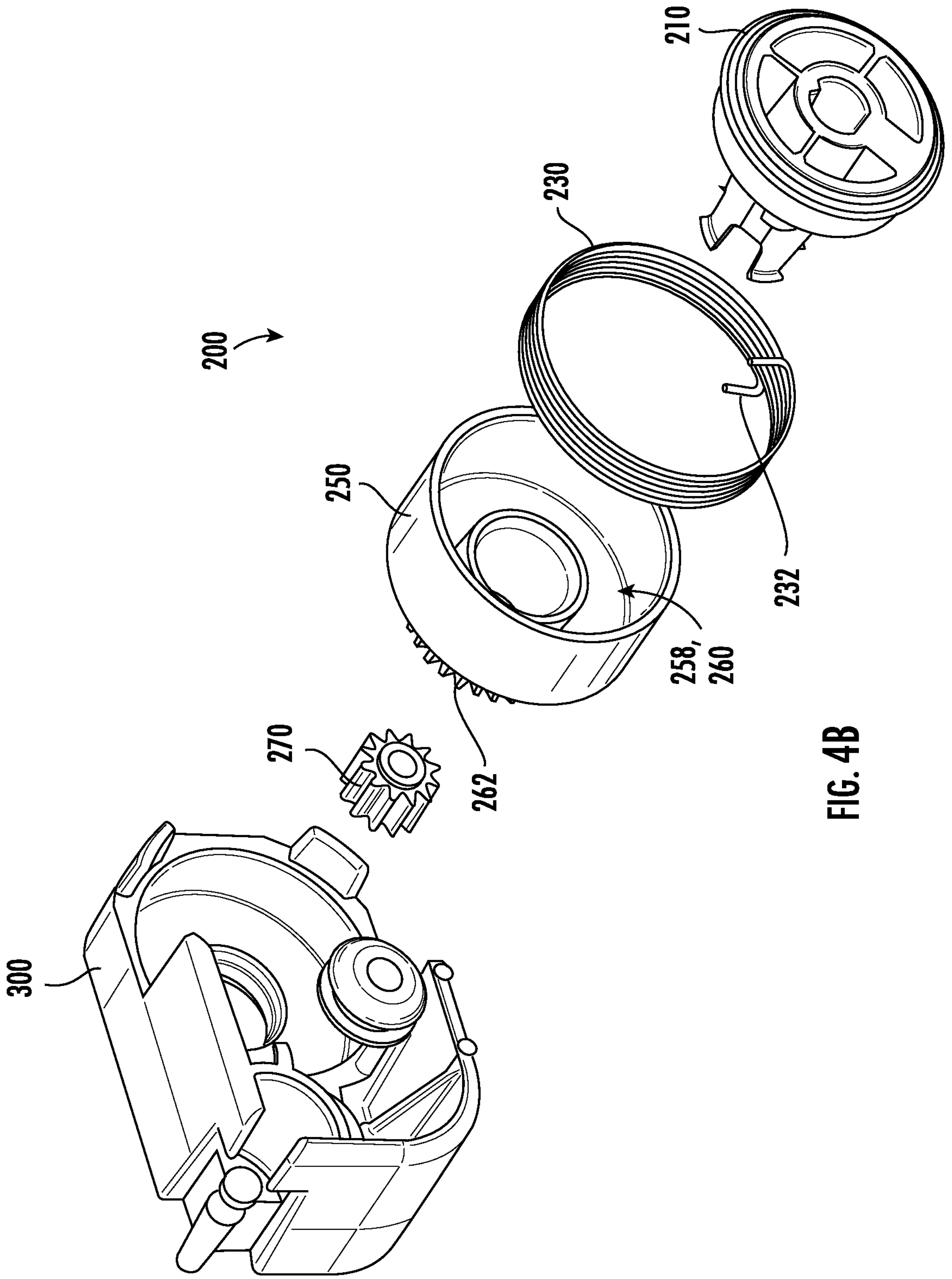
FIG. 4B is an alternate exploded, perspective view illustrating the brake assembly shown in FIG. 3.
Figure 5:
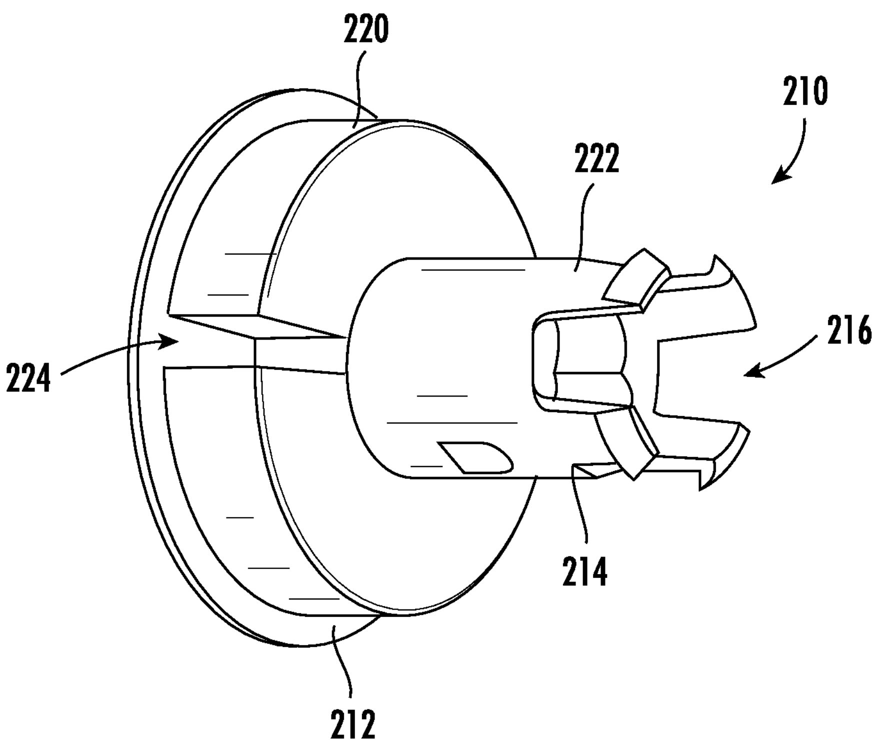
FIG. 5 is a perspective view illustrating an embodiment of a hub that may be used in the brake assembly shown in FIG. 3.
Figure 6A:
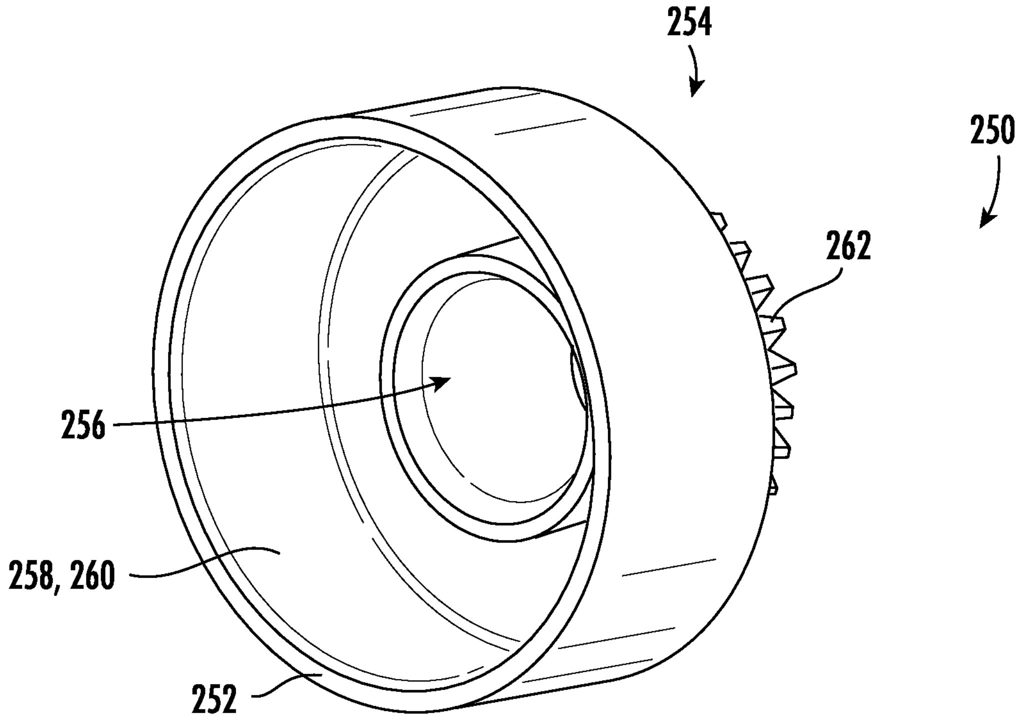
FIG. 6A is a rear perspective view illustrating an embodiment of a drum that may be used in the brake assembly shown in FIG. 3.
Figure 6B:
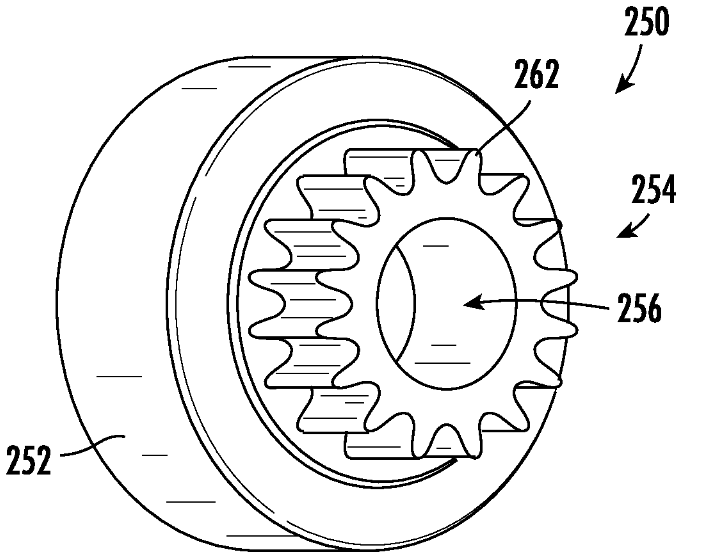
FIG. 6B is a front perspective view illustrating the drum shown in FIG. 6A.
Figure 7A:
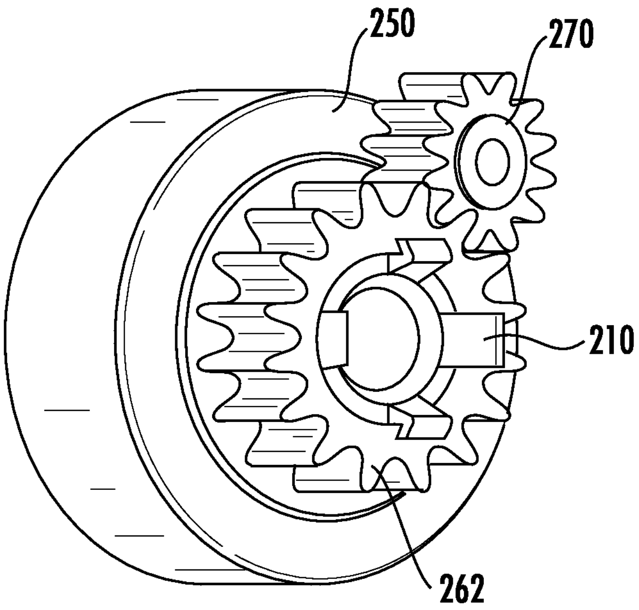
FIG. 7A is a front perspective view illustrating an embodiment of a one-way gear that may be used in the brake assembly shown in FIG. 3, the one-way gear shown engaged with the drum.
Figure 7B:
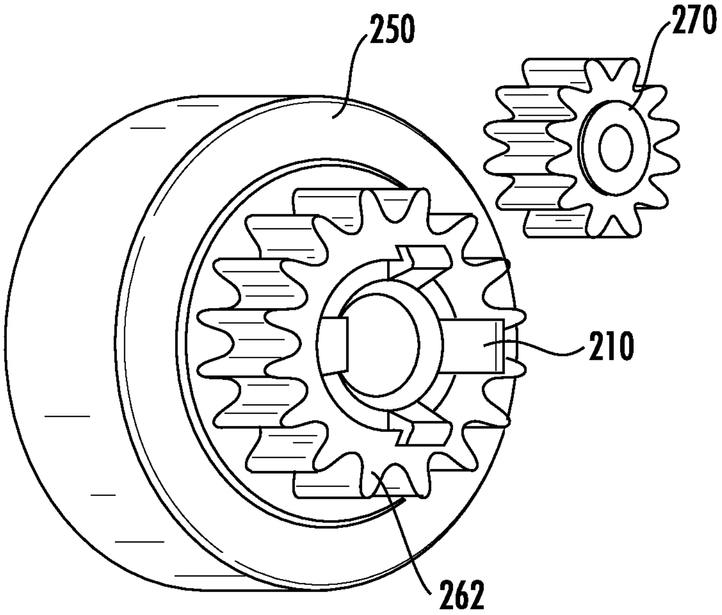
FIG. 7B is a front perspective view illustrating the one-way gear disengaged with the drum.
Figure 8:
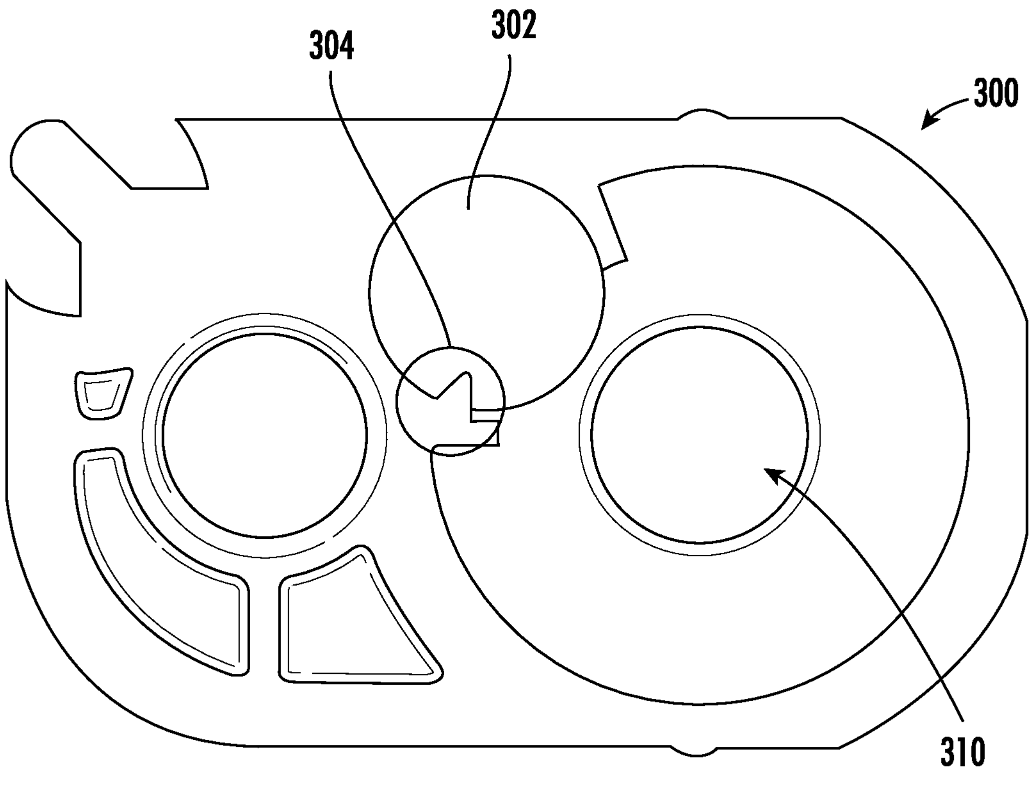
FIG. 8 is a view illustrating an example embodiment of a housing that may be used in the brake assembly shown in FIG. 3.

Referring to FIGS. 3-5, as shown, in accordance with an illustrative, non-limiting embodiment of the present disclosure, the brake assembly 200 includes a hub 210, a wrap spring 230, a drum 250, a running or one-way gear 270 (terms used interchangeably herein), and a housing 300. In addition, the brake assembly 200 may include a rubber grommet and associated grease as needed.

In use, in the illustrated, example embodiment, the hub 210 is arranged and configured to be non-rotatably coupled to the rotatable member 104 (FIG. 3). That is, the hub 210 and the rotatable member 104 are arranged and configured to rotate in unison. In some embodiments, as best shown in FIG. 5, the hub 210 may include a first end 212, a second end 214, and an internal bore 216 passing therethrough (e.g., the internal bore 216 passing from the first end 212 to the second end 214). Thus arranged, the rotatable member 104 may be received within, pass through, etc. the internal bore 216 in the hub 210. In addition, the hub 210 may be keyed to the rotatable member 104 to ensure that the rotatable member 104 and the hub 210 rotate in unison, although the hub 210 may be coupled to the rotatable member 104 by alternate mechanisms such as, for example, fasteners, adhesive, press-fit, etc. In some embodiments, the hub 210 may include a projection (not shown) extending into the internal bore 216. The rotatable member 104 may include a corresponding groove or slot for receiving the projection. In some embodiments, as illustrated, the hub 210 may include a larger diameter first segment 220 and a smaller diameter second segment 222. In use, the smaller diameter second segment 222 is arranged and configured to extend through (e.g., pass through) the various components of the brake assembly 200 and into engagement with the housing 300 to hold the brake assembly 200 together. In some embodiments, as illustrated, the smaller diameter second segment 222 may include a plurality of projections, hooks, etc. to snap-fit to the housing 300, although other mechanisms for engaging the hub 210 to the housing 300 are envisioned.

In addition, the hub 210 may be operatively coupled to the wrap spring 230. In use, rotation of the hub 210 via the rotatable member 104 causes the hub 210 to rotate the wrap spring 230. In some embodiments, the wrap spring 230 may be arranged and configured to be positioned about the larger diameter first segment 220 of the hub 210. In some embodiments, the wrap spring 230 may include one or more inwardly projecting tines 232 (FIGS. 4A and 4B). In use, one of the inwardly projecting tines 232 may be received within an opening, a shelf, a groove, etc. 224 formed in the hub 210 (terms used interchangeably without the intent to limit or distinguish), although the hub 210 may be coupled to the wrap spring 230 by alternate mechanisms. In some embodiments, as illustrated, the wrap spring 230 may include first and second inwardly projecting tines 232. In use, although only a single tine 232 may be positioned within the opening 224, by providing first and second tines 232, incorrect positioning of the wrap spring 230 is hindered thus easing the insertion process.

In some embodiments, as illustrated, the opening 224 may be formed in the larger diameter first segment 220. In use, rotation of the hub 210 causes the wrap spring 230 to wrap and unwrap about the hub 210 depending on the direction of rotation (e.g., depending on the direction of rotation, the wrap spring 230 wraps and unwraps about the larger diameter first segment 220).

In some embodiments, as illustrated in FIGS. 4A, 4B, and 6A-7B, the drum 250 may include a first end 252, a second end 254, and an internal bore 256 passing therethrough (e.g., the internal bore 256 passing from the first end 252 to the second end 254). In use, the smaller diameter second segment 222 of the hub 210 is arranged and configured to pass through the internal bore 256 of the drum 250 so that the hub 210 may be coupled to the housing 300.

In addition, the drum 250 includes a receptacle 258 extending from the first end 252 thereof, the receptacle 258 being adapted and configured to receive the larger diameter first segment 220 of the hub 210 and the wrap spring 230 wound about the larger diameter first segment 220 of the hub 210 therein. In use, with the wrap spring 230 positioned within the receptacle 258 of the drum 250, the wrap spring 230 can operatively contact, or come into engagement with, the drum 250 to enable and/or disable transfer of rotation between the hub 210 and the drum 250 depending on the direction of rotation. For example, in use, when rotated in a first direction, friction force between the wrap spring 230 and an inner surface 260 of the receptacle 258 of the drum 250 enables transfer of rotation between the hub 210 and the drum 250. That is, for example, when rotated in a first direction such as a clockwise direction as shown in FIG. 9B, frictional contact between the wrap spring 230 and the inner surface 260 of the receptacle 258 of the drum 250 enables the hub 210, and hence the rotatable member 104, the wrap spring 230, the drum 250, and the one-way gear 270 to all rotate in unison so that, for example, the covering 106 can be retracted (e.g., with the one-way gear 270 in the disengaged state or configuration as will be described in greater detail below).

Figure 9A:
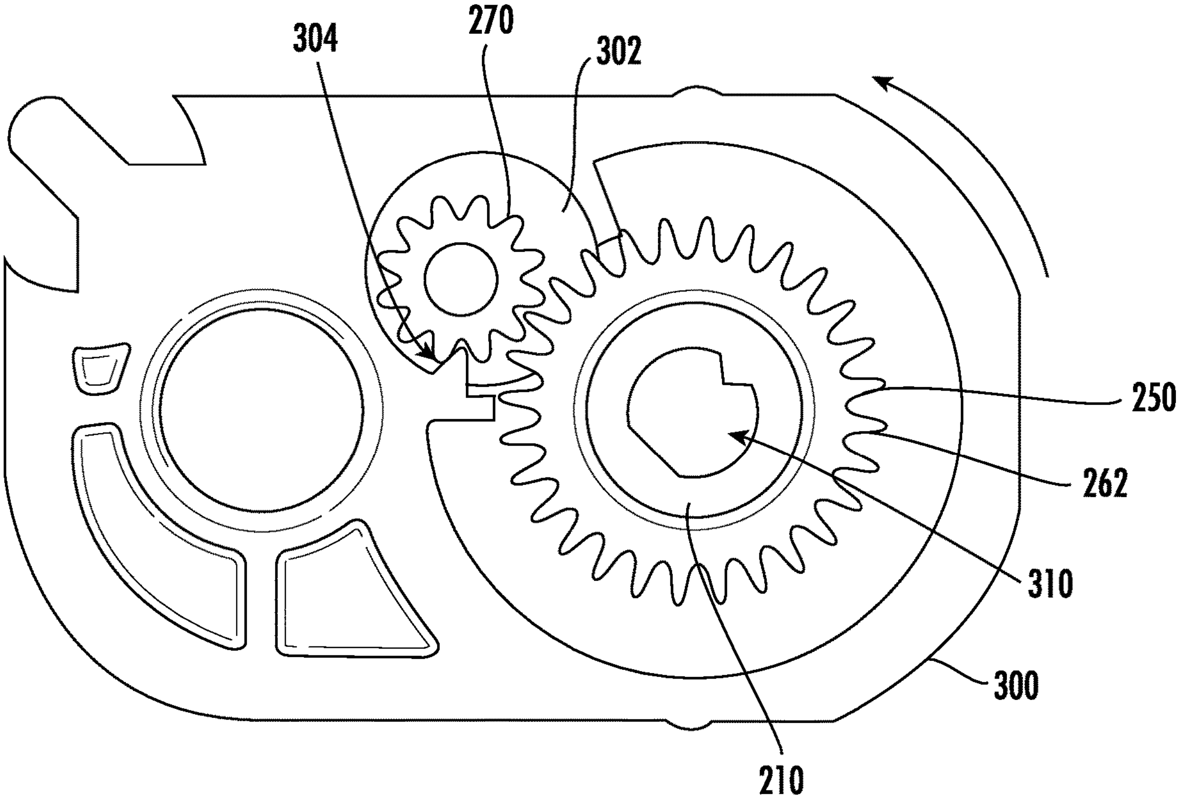
FIG. 9A is a view illustrating the housing, the drum, and the one-way gear in the engaged configuration or state.

However, in use, when rotated in the second or opposite direction such as a counterclockwise direction as shown in FIG. 9A, friction force between the wrap spring 230 and the inner surface 260 of the receptacle 258 of the drum 250 enables initial transfer of rotation between the hub 210 and the drum 250. However, as will be described in greater detail below, when rotated in the second or opposite direction, the one-way gear 270 engages the housing 300 so that rotation of the drum 250 and the one-way gear 270 is prevented. As a result, rotation of the rotatable member 104 is initially prevented. As such, unwanted extension of the covering 106 due to, for example, the force of gravity, is prevented. But, when a sufficiently large force is applied such as, for example, when the human operator pulls down on the bottom rail 102 of the architectural-structure covering 100 to deploy or extend the covering 106, the friction force between the wrap spring 230 and the drum 250 can be overcome and the wrap spring 230 can slip with respect to the drum 250, thereby enabling rotation of the wrap spring 230 relative to the inner surface 260 of the receptacle 258 of the drum 250 so that rotation of the hub 210, and hence the rotatable member 104, is allowed. That is, slippage between the wrap spring 230 and the inner surface 260 of the receptacle 258 of the drum 250 enables the wrap spring 230, the hub 210, and the rotatable member 104, and hence the covering 106, to extend or deploy by, for example, the force of the human operator pulling down on the covering 106. As will be appreciated, once the human operator stops pulling down on the covering 106, unwanted extension of the covering 106 due to, for example, the force of gravity, is inhibited and/or prevented by the brake assembly 200 (e.g., with the force by the human operator removed, frictional contact between the wrap spring 230 and the inner surface 260 of the receptacle 258 of the drum 250 prevents rotation of the hub 210, and hence the covering 106, in the second or opposite direction).

Figure 9B:
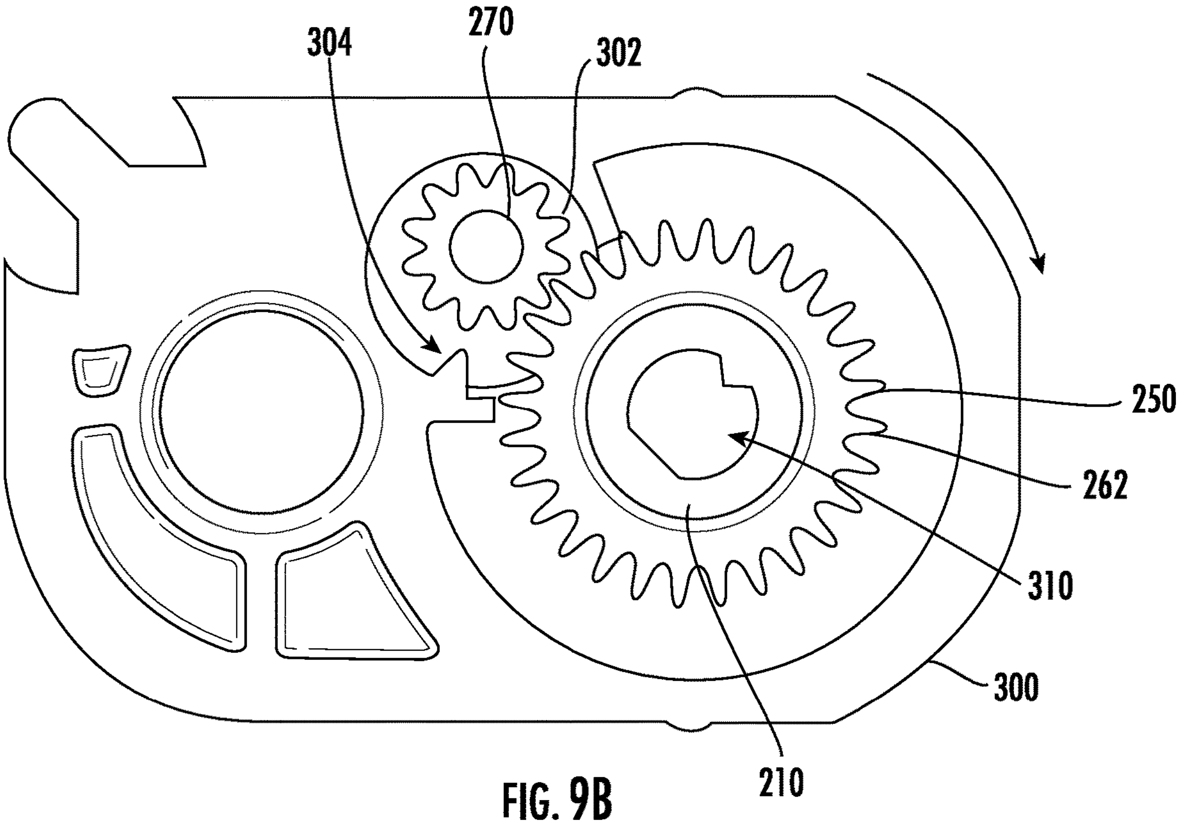
FIG. 9B is a view illustrating the housing, the drum, and the one-way gear in the disengaged configuration or state.

In addition, in use, as will be described in greater detail below, in the first or disengaged state or configuration (e.g., with the one-way gear 270 disengaged from the housing 300 as shown in FIG. 9B), rotation of the hub 210 in the first direction (e.g., clockwise direction as shown in FIG. 9B) causes the wrap spring 230 to unwind about the larger diameter first segment 220 of the hub 210 so that the wrap spring 230 expands to increase the amount of frictional contact with the inner surface 260 of the receptacle 258 (e.g., with the wrap spring 230 unwinding, the frictional force between the wrap spring 230 and the inner surface 260 of the receptacle 258 of the drum 250 is increased). In some embodiments, the frictional force between the wrap spring 230 and the inner surface 260 of the receptacle 258 of the drum 250 is increased to the point that the wrap spring 230 is locked relative to the drum 250. Thus arranged, rotation of the rotatable member 104 causes the hub 210 to rotate, which further causes the drum 250 to rotate (e.g., the rotatable member 104, the hub 210, the wrap spring 230, the drum 250, and the one-way gear 270 rotate in unison to, for example, raise or retract the covering 106). However, as will be described in greater detail below, in the second or opposite direction (e.g., counterclockwise direction as shown in FIG. 9A), the one-way gear 270 is engaged with the housing 300 to thereby prevent rotation of the one-way gear 270 in the second or opposite direction (e.g., with the one-way gear 270 engaged with the housing 300 initial rotation of the one-way gear 270, the drum 250, and the hub 210 in the second or opposite direction is prevented, or at least inhibited). As previously mentioned, this prevents, or at least inhibits, extension of the covering 106 due to the force of gravity. However, if a sufficiently large force is applied via, for example, the human operator pulling down on the bottom rail 102 of the architectural-structure covering 100, the frictional force between the wrap spring 230 and the inner surface 260 of the receptacle 258 of the drum 250 can be overcome enabling the human operator to extend or deploy the covering 106. Moreover, since rotation in the second or opposite direction causes the wrap spring 230 to wind about the hub 210, frictional contact between the wrap spring 230 and the inner surface 260 of the receptacle 258 of the drum 250 is slightly reduced thereby decreasing the frictional force between the wrap spring 230 and the drum 250 making it easier to overcome the frictional force applied by the brake assembly 200 during, for example, extension of the covering 106 by, for example, the human operator pulling down on the bottom rail 102 of the architectural-structure covering 100. However, once the force applied by the human operator is removed, the friction force of the wrap spring 230 applied against the inner surface 260 of the receptacle 258 of the drum 250 is sufficient to inhibit unwanted further movement of the covering 106 caused by, for example, gravity.

Referring to FIGS. 4A, 4B, 6A, 6B, 7A, and 7B, in the illustrated, example embodiment, the drum 250 includes a gear 262 such as, for example, a pinion gear, a spur gear, etc. disposed on the second end 254 of the drum 250 opposite to the first end 252 that contains the receptacle 258 for receiving the hub 210. In use, the gear 262 can be integrally formed with the drum 250, although it is envisioned that the gear 262 may be separately formed and coupled thereto. In use, as will be described in greater detail below, the gear 262 is arranged and configured to interact with the one-way gear 270 in a manner that will be well understood by one of ordinary skill in the art. As will be described in greater detail below, during rotation of the drum 250, the gear 262 may interact with the one-way gear 270 to engage or disengage depending on the direction of rotation.

As illustrated, in some embodiments, the one-way gear 270 may be in the form of a pinion gear, a spur gear, etc., however, the one-way gear may have any suitable form now known or hereafter developed.

Referring to FIGS. 4A, 8, 9A, and 9B, the housing 300 includes a recess or receptacle 302 arranged and configured to receive the one-way gear 270. In addition, in some embodiments, the housing 300 includes a projection, a tooth, etc. 304 extending into the receptacle 302, although this is but one configuration and alternate configurations are envisioned. For example, multiple projections or teeth may be provided. Alternatively, alternate mechanisms for creating, for example, a friction fit between the one-way gear 270 and the housing 300 may be utilized. In use, the receptacle 302 is arranged and configured to receive the one-way gear 270 in a free-floating manner (e.g., the one-way gear 270 is arranged and configured to reside within the receptacle 302). In use, the receptable 302 is arranged and configured (e.g., sized) to enable the one-way gear 270 to move into and out of engagement with the projection 304. In addition, as illustrated, the housing 300 includes an internal bore 310 extending therethrough. Thus arranged, the rotatable member 104 may pass completely through the brake assembly 200. In addition, the internal bore 310 is arranged and configured to receive the hub 210 (e.g., the smaller diameter second segment 222 of the hub 210).

In use, in accordance with the features of the present disclosure, referring to FIG. 9B, during, for example, retraction of the covering 106, the rotatable member 104 is rotated (e.g., clockwise rotation as shown in FIG. 9B) via, for example, a human operator lifting up on the bottom rail 102 of the covering 106. As a result, rotation of the rotatable member 104 rotates the hub 210, as previously described. Rotation of the hub 210 causes the wrap spring 230 to unwind and to rotate the drum 250 in the manner previously described. Rotation of the drum 250 rotates the one-way gear 270 causing the one-way gear 270 to move away from the projection 304 extending into the receptacle 302 formed in the housing 300 (e.g., causing the one-way gear 270 to disengage from the housing 300). Thus arranged, with the one-way gear 270 disengaged from the housing 300, the drum 250 rotates in unison with the rotatable member 104, the hub 210, and the wrap spring 230. As such, the rotatable member 104 is free to rotate with little to no resistance from the brake assembly 200 (e.g., the hub 210, the wrap spring 230, the drum 250, and the one-way gear 270 all rotate in unison).

However, when rotated in the second or opposite direction (counterclockwise direction in FIG. 9A), additional unintended or unwanted deployment or extension of the covering 106 caused by, for example, gravity, may be prevented, or at least inhibited, by the brake assembly 200. That is, rotation of the rotatable member 104 in the second or opposite direction via, for example, the force of gravity, (e.g., counterclockwise rotation in FIG. 9A) rotates the hub 210 in the second or opposite direction, which causes the wrap spring 230 to wind about the hub 210 so that the wrap spring 230 contracts. Initially, rotation of the hub 210 may be transmitted to the drum 250 via the wrap spring 230 so that the drum 250 may begin to rotate in the second or opposite direction. However, in the second or opposite direction, the one-way gear 270 engages the projection 304 of the housing 300, thus fixing the one-way gear 270, and hence the drum 250, to the housing 300 and thus initially preventing, or at least inhibiting, unwanted deployment or extension of the covering 106 via the force of gravity. However, with the application of sufficient force by, for example, a human operator, the wrap spring 230 can slip relative to the drum 250 so that the hub 210 and the wrap spring 230 rotate relative to the drum 250, the one-way gear 270, and the housing 300. That is, in the second or opposite direction, the one-way gear 270 engages the housing 300, which prevents or at least inhibits unwanted movement of the covering 106 via the force of gravity. However, with the application of sufficient force by, for example, a human operator, the wrap spring 230 can slip relative to the drum 250 so that the hub 210 and the wrap spring 230 rotate relative to the drum 250, the one-way gear 270, and the housing 300. That is, at this point, the drum 250 can slip relative to the hub 210 and the wrap spring 230 so that rotation of the rotatable member 104, the hub 210, and the wrap spring 230 is permitted relative to the one-way gear 270 and the housing 300. Thus arranged, in use, engagement of the one-way gear 270 with the housing 300 prevents movement of the covering 106 via, for example, the force of gravity. However, when the human operator applies a sufficiently large force by pulling down on the bottom rail 102 of the covering 106, the wrap spring 230 can slip relative to the inner surface 260 of the receptacle 258 of the drum 250 thereby allowing the human operator to extend or deploy the covering 106.

In one preferred embodiment, the projection 304 extends into the receptacle 302 along a bottom surface thereof. Thus arranged, in use, the one-way gear 270 is arranged and configured to move into engagement with the projection 304 via the force of gravity (e.g., in a preferred embodiment, upon ceasing rotation of the drum 250 in the first direction via removal of the force applied by the human operator lifting on the bottom rail 102, the one-way gear 270 automatically and/or immediately moves or falls via the force of gravity into engagement with the projection 304, which in turns, prevents movement or unwanted extension of the covering 106 via the force of gravity). Alternatively, rotation of the drum 250, and more specifically, the gear 262, in the counterclockwise direction as illustrated in FIG. 9A, causes the interaction of the gear 262 with the one-way gear 270 to engage the projection 304.

While the present disclosure refers to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The foregoing description has broad application. It should be appreciated that the features disclosed herein may be used in connection with many types of architectural-structure coverings. Similarly, it should be appreciated that the features disclosed herein may be used in connection with many types of operating systems. For example, the features may apply equally to any type of architectural-structure covering having a covering movable across an architectural structure. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive features may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more embodiments or configurations for the purpose of streamlining the disclosure. However, it should be understood that various features of the embodiments or configurations of the disclosure may be combined in alternate embodiment, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The phrases "at least one", "one or more", and "and/or", as used herein, are open-ended expressions that are both conjunctive and disjunctive in operation. The terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative to sizes reflected in the drawings attached hereto may vary.

We claim:

1. A brake assembly for use in an architectural-structure covering, the architectural-structure covering including a rotatable member and a covering movable between a retracted position and an extended position, the brake assembly being arranged and configured to couple to the rotatable member, the brake assembly arranged and configured to permit rotation of the rotatable member in a first direction and to inhibit rotation of the rotatable member in an opposite direction relative to the first direction to maintain a position of the covering, the brake assembly comprising:

a housing;

a hub arranged and configured to be non-rotatably coupled to the rotatable member so that the rotatable member and the hub rotate in unison;

a drum including a gear;

a wrap spring configured to operatively couple the hub and the drum; and a one-way gear operatively associated with the gear of the drum;

wherein:

in the first direction, the one-way gear is in a disengaged state relative to the housing;

in the opposite direction, the one-way gear is in an engaged state relative to the housing;

rotation in the first direction causes the hub to rotate the wrap spring, which rotates the drum and the one-way gear so that the hub, the wrap spring, the drum, and the one-way gear rotate in unison; and rotation in the opposite direction causes the hub to rotate the wrap spring, with the one-way gear engaged to the housing, the drum can slip relative to the wrap spring so that rotation of the hub is no longer transferred to the drum.

2. The brake assembly of claim 1, wherein the wrap spring includes an inwardly projecting tine arranged and configured to be received within an opening formed in the hub.

3. The brake assembly of claim 1, wherein:

rotation in the first direction causes the wrap spring to expand thereby increasing frictional forces between the wrap spring and the drum; and rotation in the opposite direction causes the wrap spring to constrict thereby decreasing the frictional forces with the drum.

4. The brake assembly of claim 1, wherein the hub includes a larger diameter first segment and a smaller diameter second segment, the wrap spring is arranged and configured to be positioned about the larger diameter first segment of the hub.

5. The brake assembly of claim 4, wherein the smaller diameter second segment is arranged and configured to extend through the drum and into engagement with the housing to hold the brake assembly together.

6. The brake assembly of claim 5, wherein the drum includes a receptacle extending from a first end thereof, the receptacle arranged and configured to receive the larger diameter first segment of the hub and the wrap spring wound thereabout.

7. The brake assembly of claim 6, wherein the wrap spring is arranged and configured to operatively contact an inner surface of the receptacle of the drum to transfer rotation between the hub and the drum in the first direction, and is arranged and configured to slip with respect to the inner surface of the receptacle of the drum thereby preventing transfer of rotation between the hub and the drum in the opposite direction.

8. The brake assembly of claim 1, wherein the gear of the drum is a pinion gear formed at a second end thereof, the pinion gear arranged and configured to interact with the one-way gear.

9. The brake assembly of claim 1, wherein the housing includes a receptacle formed therein, the receptacle arranged and configured to receive the one-way gear, the housing further including a projection extending into the receptacle.

10. The brake assembly of claim 9, wherein the receptacle is arranged and configured to receive the one-way gear in a free-floating manner.

11. The brake assembly of claim 10, wherein the projection extends into the receptacle along a bottom surface thereof so that the one-way gear moves into engagement with the projection via gravity.

12. The brake assembly of claim 11, wherein rotation of the drum in the first direction maintains the one-way gear in the disengaged state.

13. The brake assembly of claim 9, wherein the receptable is sized and configured so that the one-way gear resides within the receptacle such that the one-way gear can move into and out of engagement with the projection.

14. The brake assembly of claim 13, wherein with the one-way gear in the disengaged state, the one-way gear does not interact with the projection of the housing, and with the one-way gear in the engaged state, the one-way gear interacts with the projection to secure the one-way gear and the drum to the housing.

15. The brake assembly of claim 14, wherein in the disengaged position, the hub, the wrap spring, and the drum all rotate in unison.

16. A brake assembly for use in an architectural-structure covering, the architectural-structure covering including a rotatable member and a covering movable between a retracted position and an extended position, the brake assembly being arranged and configured to couple to the rotatable member, the brake assembly arranged and configured to permit rotation of the rotatable member in a first direction and to inhibit rotation of the rotatable member in an opposite direction relative to the first direction to maintain a position of the covering, the brake assembly comprising:

a housing including a receptacle formed therein and a projection extending into the receptacle;

a hub arranged and configured to be non-rotatably coupled to the rotatable member so that the rotatable member and the hub rotate in unison;

a drum including a gear;

a wrap spring configured to operatively couple the hub and the drum; and a one-way gear operatively associated with the gear of the drum, the one-way gear positioned within the receptacle of the housing;

wherein:

in the first direction, the one-way gear is disengaged relative to the projection of the housing;

in the opposite direction, the one-way gear is engaged with the projection of the housing, the one-way gear being free-floating within the receptacle of the housing so that the one-way gear moves into engagement with the projection under an influence of gravity;

rotation in the first direction causes the hub to rotate the wrap spring, which rotates the drum and the one-way gear so that the hub, the wrap spring, the drum, and the one-way gear rotate in unison; and rotation in the opposite direction causes the hub to rotate the wrap spring, with the one-way gear engaged with the projection, the drum can slip relative to the wrap spring so that rotation of the hub is no longer transferred to the drum.

17. The brake assembly of claim 16, wherein:

rotation in the first direction causes the wrap spring to expand thereby increasing frictional forces between the wrap spring and the drum; and rotation in the opposite direction causes the wrap spring to constrict thereby decreasing the frictional forces with the drum.

18. The brake assembly of claim 17, wherein the drum includes a receptacle extending from a first end thereof, the receptacle arranged and configured to receive a portion of the hub and the wrap spring wound thereabout, the wrap spring being arranged and configured to contact an inner surface of the receptacle of the drum to transfer rotation between the hub and the drum in the first direction, and to slip with respect to the inner surface of the receptacle of the drum thereby preventing transfer of rotation between the hub and the drum in the opposite direction.

19. The brake assembly of claim 16, wherein the gear of the drum is a pinion gear formed at a second end thereof, the pinion gear arranged and configured to interact with the one-way gear such that rotation of the drum in the first direction maintains the one-way gear away from the projection.

20. The brake assembly of claim 19, wherein the receptable of the housing is sized and configured so that the one-way gear resides within the receptacle such that the one-way gear can move into and out of engagement with the projection.

* * * * *